Aug. 12, 1930.  F. A. TRINKLE  1,772,597
CONTROL MECHANISM
Original Filed Dec. 20, 1924  2 Sheets-Sheet 2
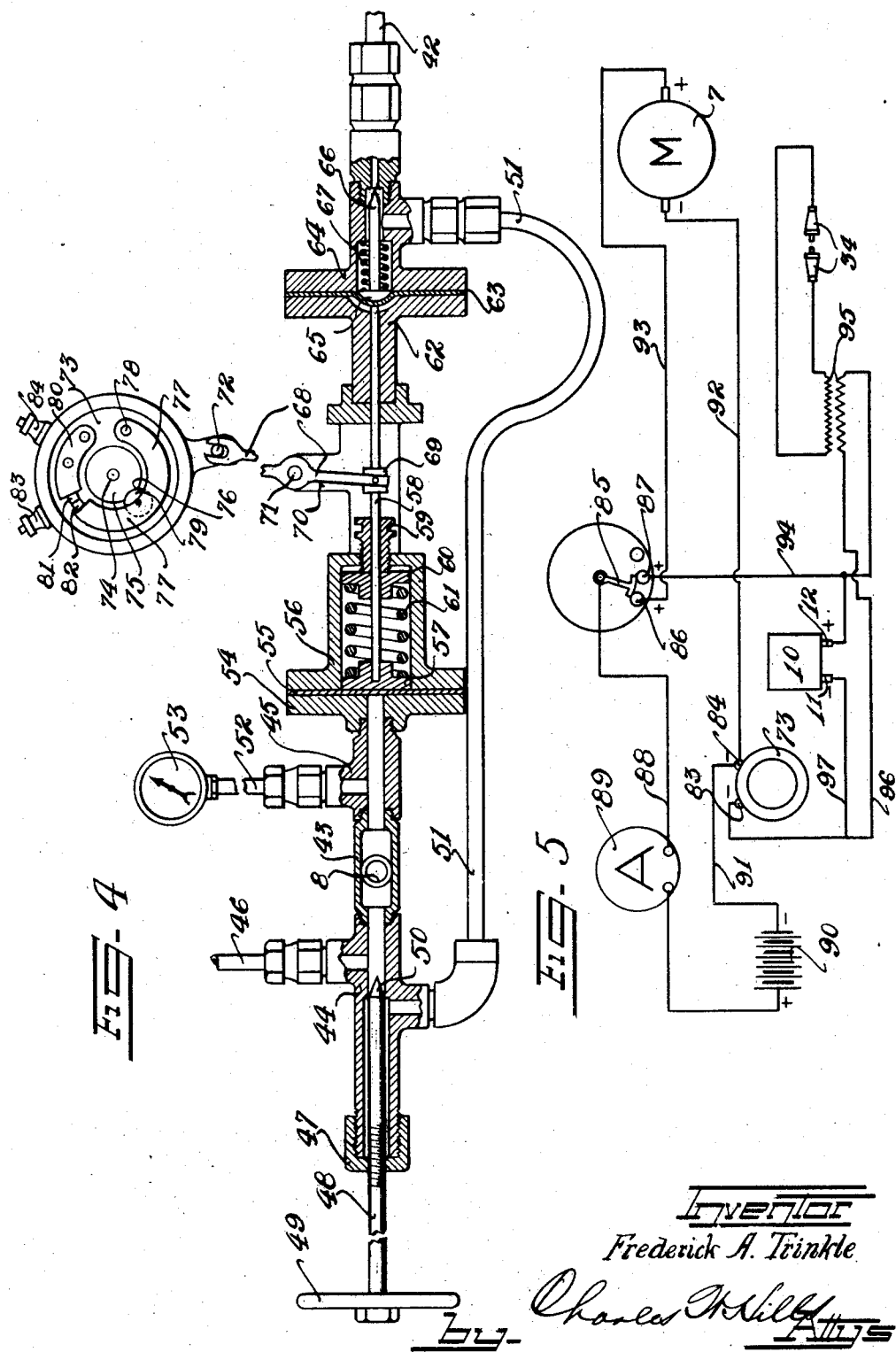
Inventor
Frederick A. Trinkle Patented Aug. 12, 1930

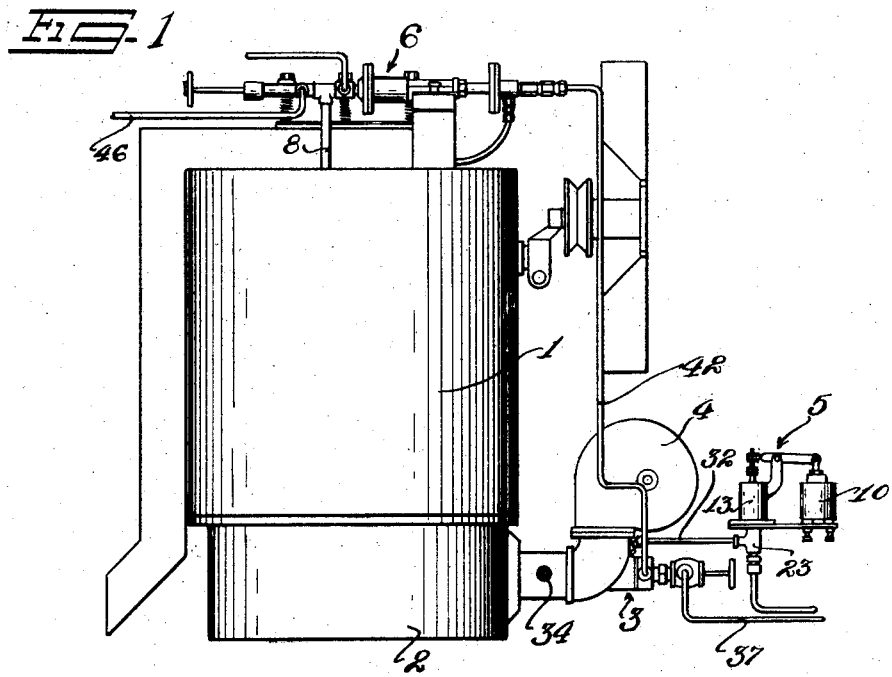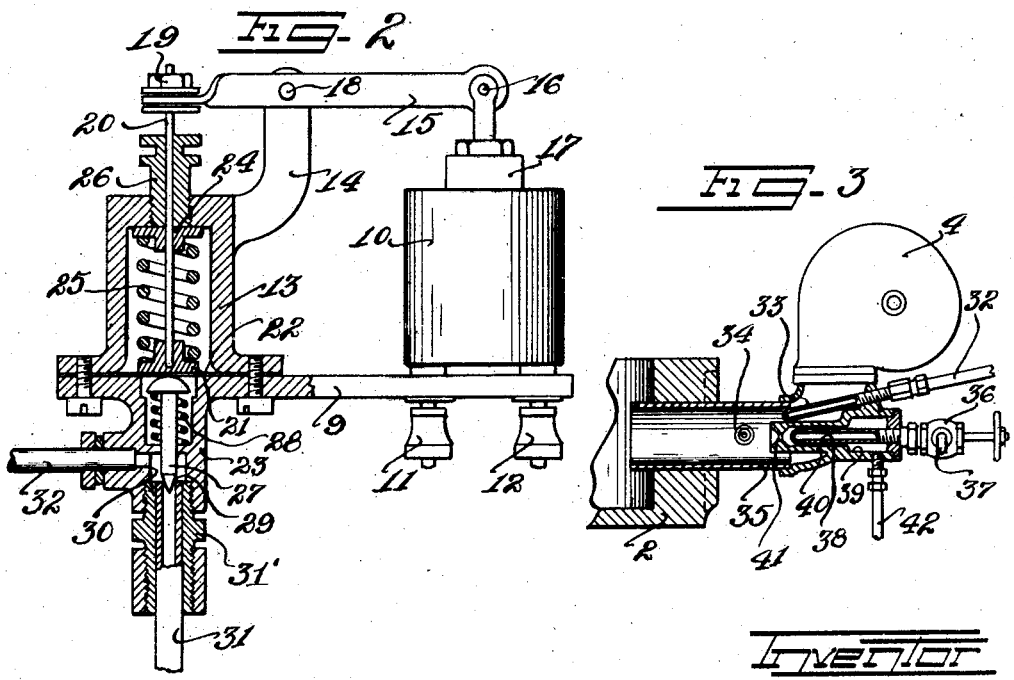

1,772,597

UNITED STATES PATENT OFFICE

FREDERICK A. TRINKLE, OF HARVEY, ILLINOIS

CONTROL MECHANISM

Original application filed December 20, 1924, Serial No. 757,226. Divided and this application filed August 31, 1928. Serial No. 303,355.

This invention relates to improvements in control mechanism, and more particularly to control mechanism of a type highly desirable for regulating the fuel supply and controlling the heating means of steam power plants, although the invention has many and varied uses and functions as will be apparent to one skilled in the art. The present invention is a division of the structure shown and described in my copending application for patent for power plant, Serial No. 757,226, filed December 20, 1924.

In the past, many and varied devices have been developed for the control of steam or similar fluid and for controlling the means for producing the working fluid, but these formerly known devices have, in most instances, proven objectionable in that they were not sufficiently positive in their action, were not as completely automatic as is desirable, and were not arranged to function immediately upon minute variations in steam pressure to either increase the pressure or prevent the same from increasing beyond a predetermined amount.

The present invention has been designed to overcome the above noted defects and objections in the provision of a boiler or the like having both primary and secondary heating means, and equipped with control mechanism for automatically stopping or starting said heating means individually or simultaneously in accordance with variations in pressure in the boiler.

The invention also seeks to provide control mechanism for a power plant utilizing both primary and secondary heating means, which mechanism is designed for stopping the primary heating means in response to an increase in steam pressure, and for retarding or accelerating the secondary heating means in accordance with relatively slight variations in the steam pressure without affecting the primary heating means.

Another object of the present invention is to provide control mechanism for a steaming plant equipped with electrical means for igniting the fuel in the heating means of the plant and for controlling the supply of fuel thereto, which mechanism is designed for making or breaking the circuit through said electrical means in accordance with variations in steam pressure.

A further object of the present invention is to provide controlling means for a heating plant of the type described herein which means are simple and positive in their operation for automatically and effectively maintaining the fluid pressure in the plant at substantially a predetermined value.

A still further object of the present invention is to provide a control mechanism for a steam plant utilizing primary and secondary heating means, which mechanism is designed for cutting off the primary heating means when the pressure reaches a predetermined value, and for maintaining the pressure at this value by accelerating or retarding the secondary means in accordance with variations in the pressure.

While some of the more salient features, characteristics, and advantages, of means embodying the present invention have been above pointed out, others will become apparent from the following disclosure.

The invention includes these and other features of construction and combinations of parts hereinafter described and shown in a preferred form in the drawings, as more particularly indicated by the claims.

On the drawings:

Figure 1 is a fragmentary view in elevation of a steam power plant equipped with control mechanism embodying the principles of the present invention.

Figure 2 is an enlarged, fragmentary, part sectional part elevational view of a mechanism shown at the extreme right of Figure 1.

Figure 3 is an enlarged fragmentary part sectional and part elevational view of the structure shown in Figure 1 adjacent that shown in Figure 2.

Figure 4 is an enlarged fragmentary part sectional part elevational view of the portion of the control mechanism shown at the top of Figure 1.

Figure 5 is a schematic diagram of an electrical circuit which may successfully be used with and incorporated in the present invention.

As shown in the drawings:

In the structure arbitrarily selected to illustrate an embodiment of the present invention, there is shown a boiler 1 for producing steam under pressure, this boiler being clearly shown and described in my above referred to copending application. Disposed beneath the boiler is a burner 2 of the type designed for burning atomized fuel and equipped with a burner mechanism 3 which is augmented by a blower 4. Adjacent the blower and burner mechanism is a solenoid actuated control device 5 for controlling the fuel supply to the primary heating means of the boiler, the mechanism 3 affording a fuel supply to the secondary heating means of the boiler. Automatically controlled mechanism 6, in this instance, shown at the top of the boiler 1, governs and controls the mechanism 3 for the secondary heating means, the mechanism 5, for the primary heating means, and the motor 7 (Figure 5) which operates the blower 4. The mechanism 6 is directly connected with the interior of the boiler through the steam pipe 8 and is responsive in its operation to variations in the steam pressure within the boiler. This mechanism 6 governs the secondary heating means 3 by controlling the amount of steam admitted thereto for atomizing the fuel supplied thereto from any desirable source, and also controls the blower 4 and primary heating means by controlling the electrical circuit which actuates the blower motor 7 and the primary fuel supply means 5.

*The primary fuel supply means*

The primary fuel supply means, designated by numeral 5 in Figure 1, in this instance, incorporates a base plate 9 which is mounted in any desired location relative to the other elements embodied in the present invention, and upon which is mounted a solenoid 10 provided with the customary negative and positive binding posts 11 and 12, respectively. Also mounted on the base plate 9 is a housing 13 provided with an upwardly extending arm 14. A link 15 connected at one end, as at 16, to the solenoid plunger 17, is pivoted, as at 18, to the arm 14 and connected at its other end, as at 19, to a rod 20, reciprocal in the housing 13. The opposite or lower end of the rod 20 is suitably secured to a bearing member 21 which is rigidly secured to a diaphragm 22 clamped between the housing 13 and the base plate 9 and disposed over a depending housing 23 integral with the plate 9. A second bearing member 24 through which the rod 20 is slidable is disposed at the upper portion of the housing 13 and maintained in this position by a coiled spring 25 disposed between suitable flanges on the bearing members 21 and 24. The spring 25 tends to separate the bearing members 21 and 24 and thereby hold the control portion of the diaphragm in inward position. An adjustment plug 26 is threaded into the top of the housing 13 into abutment with the bearing member 24 so that the plug may be actuated to vary the tension of the spring 25. Disposed within the housing 23 is a valve 27, the stem of which is provided with a rounded head for abutment with the under side of the diaphragm 22. A coiled spring 28 disposed between the aforesaid rounded head and an integral shoulder within the housing 23 urges the valve upwardly against the diaphragm and away from the valve seat 29 to establish communication between an interior chamber 30 in the housing 23 and an intake pipe 31 connected to the housing, in any desired manner, or as shown by bushing 31'. The opposite end of the intake pipe 31 communicates with any suitable fuel supply source, such as a gasolene tank for example. When the valve 27 is opened, the gasolene will pass through the pipe 31 into the chamber 30, exit through a pipe 32 also in communication with the chamber 30, and enter the burner 2, (Figure 3) through the nozzle 33 where the gasolene is ignited by sparks from opposed plugs 34.

When the solenoid 10 is energized, the plunger 17 is pulled downwardly thereby elevating the rod 20 against the action of the spring 25, and raising the diaphragm 22 to permit the spring 28 to open the valve 27 and admit gasolene to the pipe 32. When the solenoid is deenergized the spring 25 forces the bearing member 21 downwardly pushing the diaphragm against the rounded head of the valve 27 to thereby close the latter and cut off the fuel supply from the pipe 32.

*The secondary fuel supply and heating means*

As seen clearly in Figure 3, the structure generally designated by reference numeral 3 in Figure 1, comprises a cylinder 35 projecting into the interior of the burner 2, the gasolene nozzle 33 terminating just inside the cylinder 35, and the sparking means 34 being disposed in such a position that the gasolene will be ignited within the cylinder 35 and the flames blown by the blower 4 into the burner 2, to thereby provide primary heating means for the boiler 1 by the aid of which steam under adequate pressure may be quickly produced. Disposed beneath the primary heating means are the secondary heating means which include a valve housing 36 containing a hand valve for controlling the supply of any desirable liquid fuel through an intake 37 from any desirable source. The fuel passes through the valve in the housing 36 into a nozzle 38 which is disposed within the chamber 39 in a casting 40 shaped to provide a final nozzle 41 in proximity to the spark plugs 34. A steam pipe 42 is threaded into the casing 40 to communicate with the chamber 39 to permit steam under pressure to mix with the liquid fuel admitted by the nozzle 38 so that the fuel will be thoroughly atomized as or before it passes through the nozzle 41 where it is ignited either by the spark plugs 34 or by the flame produced by the primary heating means.

*The pressure responsive control mechanism*

Now with reference to Figure 4, it will be seen that the pipe 8 previously referred to in connection wtih Figure 1, has attached to the upper end thereof a T 43 to which is secured at the opposite end thereof T members 44 and 45, respectively. Communicating with the upper outlet of T member 44 is a pipe 46 which is connected to any suitable type of water regulator (not shown) for regulating the supply of water to the boiler in accordance with the steam temperature. At its outer portion the T member 44 is elongated, the passage therein enlarged, and the end closed by a suitable cap 47 in which a valve stem 48 is threaded. The valve stem is manually operated by a handle 49 to open or close a valve 50 on the inner end of the stem to control the admission of steam from the pipe 8 to a bypass 51.

The upper passage of the T member 45 communicates with the pipe 52 which is connected to any suitable steam pressure gage 53. The inner end of this T member 45 is connected to a flange 54 the inner side of which is covered by a diaphragm 55 held in position by the flange 54 and the flanged margin of a housing 56. Within the housing 56 is a bearing member 57 in abutment with the diaphragm 55, which bearing member is rigidly connected to a reciprocatory rod 58 slidable through an adjusting plug 59 in the opposite end of the housing 56. A second bearing member 60 loosely engaged around the rod 58 is maintained in abutment with the plug 59 by a coiled spring 61.

The rod 58 projects into a second housing 62 into abutment with the diaphragm 63 maintained in position by the housing 62 and an opposed housing 64. The diaphragm 63 has an arcuate center portion and the housing 62 is recessed accordingly. On the opposite side thereof, the arcuate portion of the diaphragm is abutted by a rounded head 65 of a valve 66 which controls the admission of steam from the bypass 51 into the pipe 42 leading to the secondary heating means. The valve 66 is urged into open position by a coiled spring 67 seated in a suitable recess in the housing 64.

Assuming that the valve 50 is open, steam will pass from the pipe 8 through the passage in the T member 44 into the bypass 51, and if the valve 66 is open, through the pipe 42 into the secondary heating means to aid in atomizing the fuel therein. However, if the steam pressure in the boiler becomes excessive i. e., increases above a predetermined amount, the diaphragm 55 will be forced to the right, thereby pushing the rod 58 against the action of the spring 61 causing the arcuate portion of the diaphragm 63 to also be moved to the right to actuate valve 66 against the action of the spring 67 and cut off the admission of steam through the bypass 51 to the pipe 42 in proportion to the increased pressure to thereby retard the action of the secondary heating means. Obviously, if the steam pressure falls below the predetermined value, the rod 58 will be forced to the left by the spring 61, permitting the spring 67 to open the valve 66 and admit more steam from the bypass 51 into the pipe 42 to thereby accelerate the action of the secondary heating means. If the steam pressure becomes too excessive, the valve 66 will entirely cut off the steam from the pipe 42 and cause the secondary heating means to eventually cease functioning, but the heating means will be immediately started again when the pressure drops the proper amount as will later appear herein.

Means for controlling the primary heating means as well as providing ignition for both primary and secondary heating means are also brought into operation by the movement of rod 58 in response to variations of steam pressure in the boiler 1. These means include a lever arm 68 secured to the shaft 58, as at 69, adjacent a bracket 70 to which the lever arm 68 is pivoted, as at 71. The upper portion of the lever 68 is bifurcated to embrace a stud 72 mounted on an ear integral with a disk 73 rotatable about a shaft 74 provided on an end thereof with a fixed disk 75 having a recess 76 therein. An arcuate contact 77 is pivoted to the disk 73, as at 78, and possesses sufficient inherent resiliency so that the free end thereof is at all times urged inwardly towards the disk 75. The free end of the contact 77 is equipped with a roller member 79 positioned so as to ride around the periphery of the disk 75. A second contact member 80 is also secured to the disk 73 and is provided at one end thereof with a contact point 81 for conductive connection with a similar contact 82 on the adjacent end of the spring contact 77. Binding posts 83 and 84 are provided on the outer periphery of the disk 73 and electrically connected to the contact members 77 and 80, respectively.

When the rod 58 is in the position shown in Figure 4, the pressure being slightly below the desired amount, the roller 79 on the contact member 77 will be seated in the recess 76 in the disk 75 and thereby maintain contact points 81 and 82 connected to permit current of the same polarity to flow through binding posts 83 and 84. When the pressure increases so that the rod 58 moves to the right, the disk 73, as seen in Figure 4, will be rotated clockwise, and the roller 79 forced out of the recess 76 thereby pushing contact point 82 outwardly beyond contact point 81 to break the circuit through binding posts 83 and 84.

With reference now to Figure 5, it will be seen that a switch 85 is provided adapted to contact with either one or both of a pair of contact buttons 86 and 87, respectively. The arm 85 is connected by a conductor 88 through ammeter 89 to the positive side of a source of electrical energy 90. The negative side of the current source 90 is connected through a conductor 91 to the binding post 84 on the disk 73 thence through conductor 92 to the negative side of the blower motor 7. The positive side of the blower motor 7 is connected by conductor 93 to button 86. The button 87 is connected through a conductor 94 to suitable spark coils 95 in circuit with spark plugs 34, and also to the positive side of the solenoid 10. The negative side of the spark coils 95 and the negative side of the solenoid 10 are connected by conductors 96 and 97, respectively, to the binding post 83 on the disk 73, thereby closing the circuit through all of the elements when the contact points 81 and 82 on the disk 73 are connected.

The operation is as follows:

Assuming that it is desired to start the boiler from rest or zero steam pressure, the switch 85 is placed in the position shown in Figure 5 so that it bridges both contacts 86 and 87, thereby energizing the spark plugs 34 and solenoid 10 and causing the blower motor to operate, the contact points 81 and 82 on disk 73 being connected since there is no pressure in the boiler, the energization of the solenoid 10 will cause gasolene to be admitted to the primary heating means through the valve 27 (Figure 2), which gasolene will be ignited by the spark plugs 34. As soon as steam has been developed by the heating means, a portion of it will pass through the pipe 8, enter the bypass 51, and pass therefrom through the pipe 42, to the secondary heating means, (the valve 66 being open since there is no pressure in the boiler). When the steam enters the secondary heating means, it will atomize the fuel entering through the pipe 37 (Figure 1) and force this fuel into the burner 2, to be ignited by the fire already started therein by the primary heating means. As soon as the steam pressure has reached a predetermined value, the rod 58 (Figure 4) will move to the right and separate contact points 81 and 82 on the disk 73, thereby breaking the circuit through the solenoid 10, and spark plugs 34, totally stopping the primary heating means. The switch arm 85 is manually moved off button 86 to open the blower motor 7 circuit. If the pressure further increases the valve 66 will close a trifle further and retard the action of the secondary heating means. If the pressure drops slightly the valve 66 will open a trifle and permit more steam to enter the secondary heating means to accelerate the same. If the pressure drops materially, the rod 58 will be moved to the left sufficiently to again close the contacts 81 and 82 on the disk 73 and start the primary heating means.

If so desired, if the secondary heating means have started to function, the switch arm 85 may be moved off button 87 to the right as seen in Figure 5 and the steam pressure kept up through the secondary heating means alone.

It will be apparent that steam pressure may be kept up at the desired amount with the means above described, entirely automatically, the means requiring little or no attention.

From the foregoing, it is apparent that I have provided control mechanism which automatically maintains steam pressure in a power plant or the like, by starting, stopping, regulating, accelerating, or retarding, the heating means used to produce the steam, in accordance with the variations of steam pressure in the boiler. Moreover, the control mechanism herein described is simple in construction, efficient and positive in operation, requires a minimum of attention, is very durable, and may be economically manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In combination, a boiler, primary and secondary heating means therefor, means responsive to the steam pressure in the boiler to admit steam to the said secondary means to accelerate the said secondary heating means, and means responsive to a predetermined increase in the pressure of the steam in the boiler to stop the said primary heating means and to decrease the flow of steam to the said secondary heating means and thereby retard the last mentioned means.

2. In combination, a boiler, primary and secondary heating means therefor, blower means arranged to atomize fuel supplied to the said heating means, means responsive to the steam pressure in the boiler to stop the said primary heating means, and means arranged to atomize fuel supplied to the said secondary heating means independently of the blower, the said means being responsive to the pressure of the steam in the boiler.

3. In combination, a boiler, primary and secondary heating means therefor, blower means arranged to atomize fuel supplied to the said primary heating means, means responsive to the steam pressure in the boiler to start and stop the said primary heating means, and means responsive to the steam pressure in the boiler to control the flow of steam therefrom to the said secondary heating means and thereby accelerate or retard the said secondary heating means.

4. In combination, a boiler, primary and secondary heating means therefor, means responsive to the steam pressure in the boiler to start and stop the said primary heating means, blower means arranged to atomize fuel supplied to the said primary heating means, conduit means connecting the said secondary heating means to the steam space of the boiler, whereby steam from the boiler can atomize fuel supplied to the said secondary means, and differential valve means in operative association with the said secondary means, whereby the flow of steam to the said last named means is reduced as the steam pressure increases, and increased as the steam pressure decreases.

In testimony whereof I have hereunto subscribed my name at Chicago, Cook county, Illinois.

FREDERICK A. TRINKLE.